United States Patent
Jung et al.

(10) Patent No.: US 10,917,509 B2
(45) Date of Patent: Feb. 9, 2021

(54) SMART WATCH AND METHOD FOR UNLOCKING THE SAME

(71) Applicant: Samsung Display Co., Ltd., Yongin-si (KR)

(72) Inventors: Kyu Bong Jung, Yongin-si (KR); Dong Ho Kim, Yongin-si (KR); Min Soo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 178 days.

(21) Appl. No.: 15/825,031

(22) Filed: Nov. 28, 2017

(65) Prior Publication Data

US 2018/0248990 A1    Aug. 30, 2018

(30) Foreign Application Priority Data

Feb. 24, 2017    (KR) .................. 10-2017-0024806

(51) Int. Cl.
| | |
|---|---|
| *G06F 21/31* | (2013.01) |
| *H04M 1/67* | (2006.01) |
| *G06F 3/0338* | (2013.01) |
| *G04G 17/02* | (2006.01) |
| *G06F 3/041* | (2006.01) |
| *G06F 3/0362* | (2013.01) |
| *G06F 1/16* | (2006.01) |
| *G04G 21/00* | (2010.01) |
| *G06F 3/023* | (2006.01) |

(Continued)

(52) U.S. Cl.
CPC .............. *H04M 1/67* (2013.01); *G04G 17/02* (2013.01); *G04G 21/00* (2013.01); *G06F 1/163* (2013.01); *G06F 1/169* (2013.01); *G06F 3/0236* (2013.01); *G06F 3/0338* (2013.01); *G06F 3/0362* (2013.01); *G06F 3/041* (2013.01); *G06F 21/31* (2013.01); *G06F 3/0482* (2013.01); *G06F 2203/04806* (2013.01); *H04M 1/7253* (2013.01); *H04M 2250/12* (2013.01)

(58) Field of Classification Search
CPC ......... G06F 21/31; G06F 3/0236; G06F 1/163
USPC .......................................................... 726/19
See application file for complete search history.

(56) References Cited

U.S. PATENT DOCUMENTS

| | | |
|---|---|---|
| 8,390,585 B2 | 3/2013 | Hyun |
| 2006/0139320 A1 | 6/2006 | Lang |

(Continued)

FOREIGN PATENT DOCUMENTS

| | | |
|---|---|---|
| KR | 10-1528262 | 6/2015 |
| KR | 10-2016-0036394 | 4/2016 |

(Continued)

*Primary Examiner* — Teshome Hailu
(74) *Attorney, Agent, or Firm* — H.C. Park & Associates, PLC

(57) ABSTRACT

Provided herein may be a smart watch. The smart watch may include a display device configured to display an image; a bezel disposed on the perimeter of the display device and configured to rotate; a main body configured to support the display device; and a band coupled to the main body. The main body includes a bezel sensing unit configured to sense movement of the bezel, and a control unit configured to authenticate a user based on information received from the bezel sensing unit and configured to unlock the smart watch in response to the control unit authenticating the user.

11 Claims, 9 Drawing Sheets

(51) Int. Cl.
*G06F 3/0482* (2013.01)
*H04M 1/725* (2021.01)

(56) References Cited

U.S. PATENT DOCUMENTS

| | | | | |
|---|---|---|---|---|
| 2008/0117723 | A1* | 5/2008 | Hiranuma | G04B 19/286 |
| | | | | 368/294 |
| 2014/0047525 | A1* | 2/2014 | Bonhoff | G06F 21/36 |
| | | | | 726/7 |
| 2016/0154624 | A1* | 6/2016 | Son | H04W 4/80 |
| | | | | 704/235 |
| 2016/0327911 | A1 | 11/2016 | Eim et al. | |
| 2017/0308040 | A1* | 10/2017 | Chui | H04W 4/80 |

FOREIGN PATENT DOCUMENTS

| | | |
|---|---|---|
| KR | 10-2016-0104365 | 9/2016 |
| KR | 10-2016-0113906 | 10/2016 |
| KR | 10-2018-0131275 | 11/2016 |

* cited by examiner

SMART WATCH AND METHOD FOR UNLOCKING THE SAME

CROSS-REFERENCE TO RELATED APPLICATION

This application claims priority from and the benefit of Korean Patent Application No. 10-2017-0024806, filed on Feb. 24, 2017, which is hereby incorporated by reference for all purposes as if fully set forth herein.

BACKGROUND

Field

Exemplary embodiments relate to a smart watch and a method for unlocking the same.

Discussion of the Background

With development of information and communication technology and semiconductor technology, wearable devices, which may be worn by users, are being developed as next-generation portable electronic devices.

Representative examples of the wearable devices include a smart watch and smart glasses.

The smart watch refers to a watch having communication and computing functions, and may be connected to a smartphone to allow a user to easily check caller identification, a text message, a schedule, a social network service (SNS) message, an e-mail, etc.

Conventionally, a smart watch is unlocked by a user imputing a password through a touch screen.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a smart watch having improved security performance, and a method for unlocking the smart watch.

Additional aspects will be set forth in the detailed description which follows, and, in part, will be apparent from the disclosure, or may be learned by practice of the inventive concept.

According to exemplary embodiments, a smart watch includes: a display device configured to display an image; a bezel disposed on a perimeter of the display device and configured to rotate; a main body configured to support the display device; and a band coupled to the main body. The main body may include a bezel sensing unit configured to sense movement of the bezel, and a control unit configured to authenticate a user based on information received from the bezel sensing unit and unlock the smart watch in response to the control unit authenticating the user.

According to exemplary embodiments, a smart watch includes a display device configured to display an image; a bezel disposed on a perimeter of the display device and configured to move upward or downward; a main body configured to support the display device; and a band coupled to the main body. The main body may include a bezel sensing unit configured to sense movement of the bezel, and a control unit configured to unlock the smart watch based on information received from the bezel sensing unit.

According to exemplary embodiments, a method for unlocking a smart watch includes generating bezel information, based on movement and a state of a bezel; determining an input password, based on the bezel information; comparing the input password with a registered password; and unlocking the smart watch when the input password matches the registered password. The bezel information may include at least one of a rotation direction information, a rotation angle information, a state information, a push information, and a pull information.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EXEMPLARY EMBODIMENTS

Figure 1:
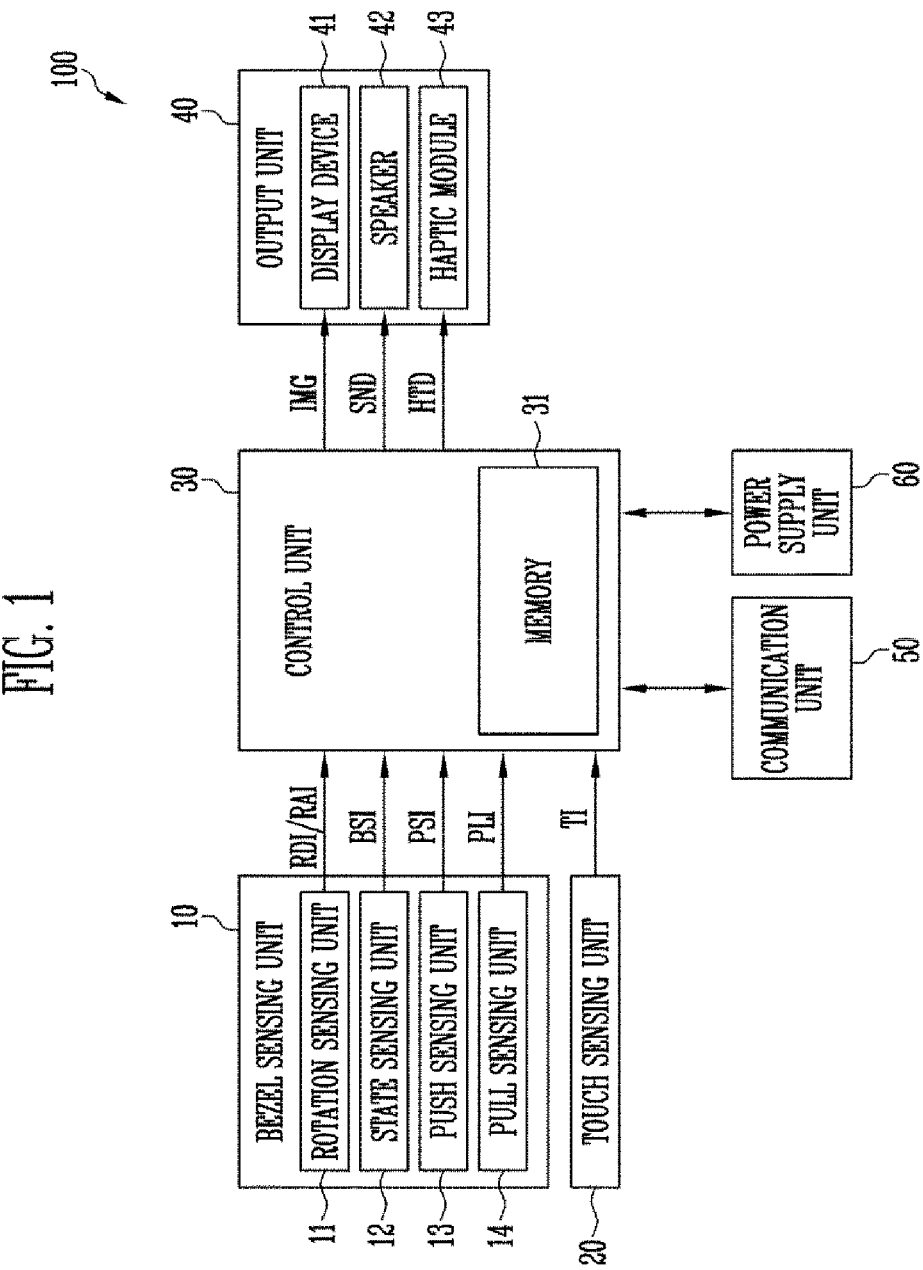
FIG. 1 is a block diagram illustrating a smart watch according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

FIG. 1 is a block diagram illustrating a smart watch 100 according to an exemplary embodiment of the present disclosure. Referring to FIG. 1, the smart watch 100 may include a bezel sensing unit 10 (or bezel sensor 10), a touch sensing unit 20 (or touch sensor 20), a control unit 30 (or controller 30), an output unit 40, a communication unit 50 (communicator 50), and a power supply unit 60 (or power supply 60).

Components shown in FIG. 1 are not essential for implementing the smart watch 100. Therefore, the number of components of the smart watch 100 may be increased or reduced compared to that of the present exemplary embodiment.

Referring to FIG. 1, the bezel sensing unit 10 may sense movement of a bezel. For example, the bezel sensing unit 10 may sense the rotation, the state, and the movement of the bezel.

In the present disclosure, the words "push movement of the bezel" refer to downward movement of the bezel, and the words "pull movement of the bezel" refer to upward movement of the bezel.

In an exemplary embodiment, the bezel may be pushed or pulled by a user so that the bezel may move downward or upward.

The bezel sensing unit 10 may include a rotation sensing unit 11, a state sensing unit 12, a push sensing unit 13, and a pull sensing unit 14.

Figure 4A:
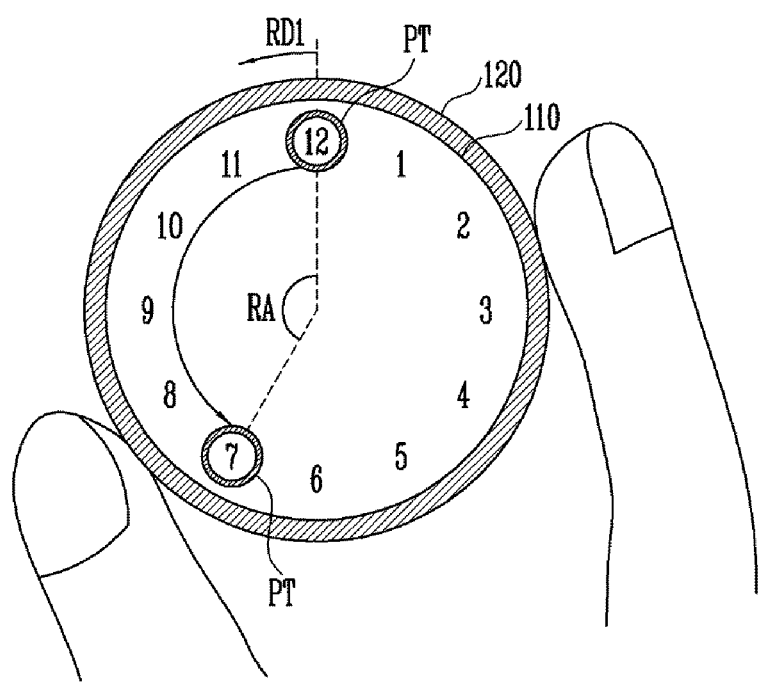
FIGS. 4A and 4B are views illustrating an operation of a smart watch according to an exemplary embodiment of the present disclosure.
Figure 4B:
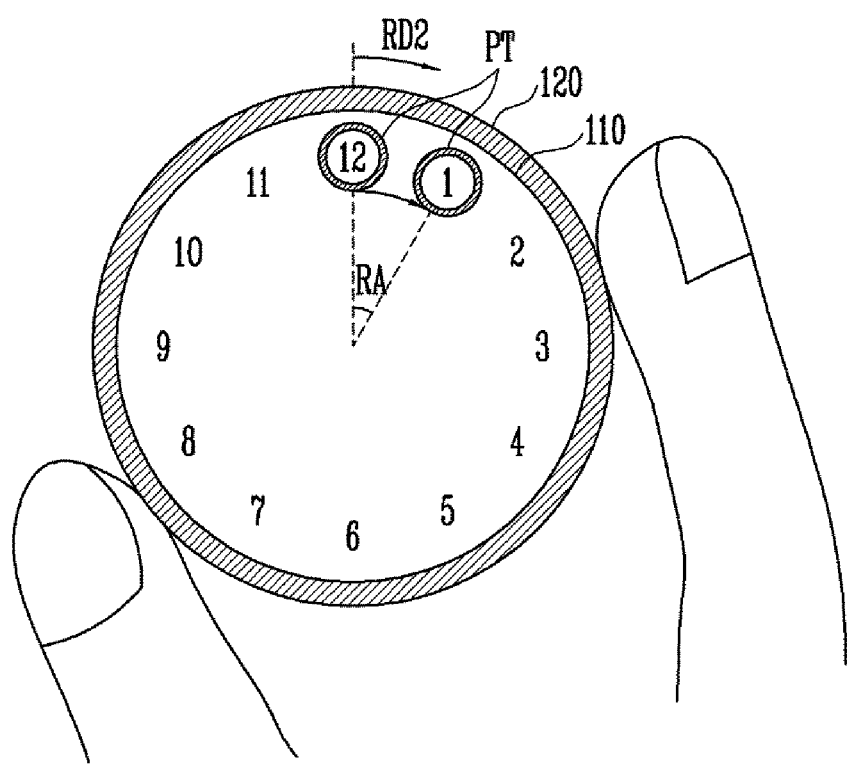

Referring to FIGS. 4A and 4B, the rotation sensing unit 11 may sense a rotation direction of the bezel (e.g., a counter-clockwise direction RD1 or a clockwise direction RD2) and a rotation angle RA of the bezel. The rotation sensing unit 11 may include an optical encoder or a potentiometer. Other details pertaining to rotation sensing unit 11 will be explained later herein with reference to FIGS. 4A and 4B.

The rotation sensing unit 11 may generate rotation direction information RDI corresponding to the rotation direction of the bezel, and transmit the generated rotation direction information RDI to the control unit 30. The rotation sensing unit 11 may generate rotation angle information RAI corresponding to the rotation angle of the bezel, and transmit the generated rotation angle information RAI to the control unit 30.

Figure 5A:
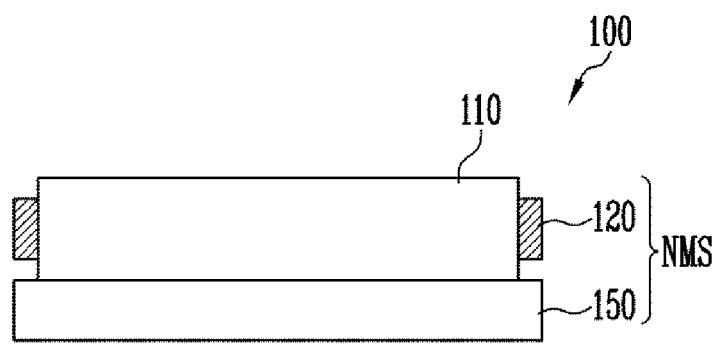
FIGS. 5A, 5B, and 5C are views illustrating the movement and the state of a bezel included in a smart watch according to an exemplary embodiment of the present disclosure.
Figure 5B:
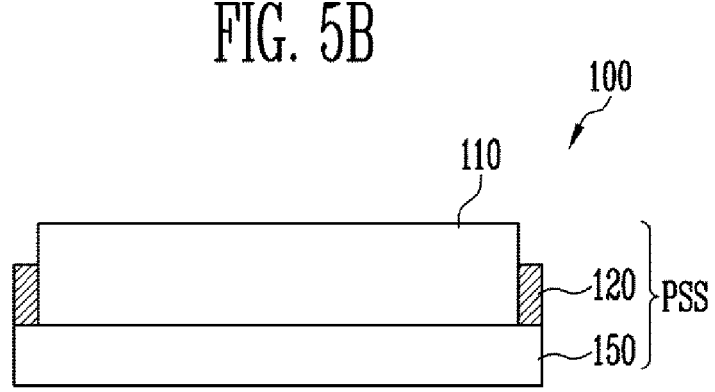
Figure 5C:
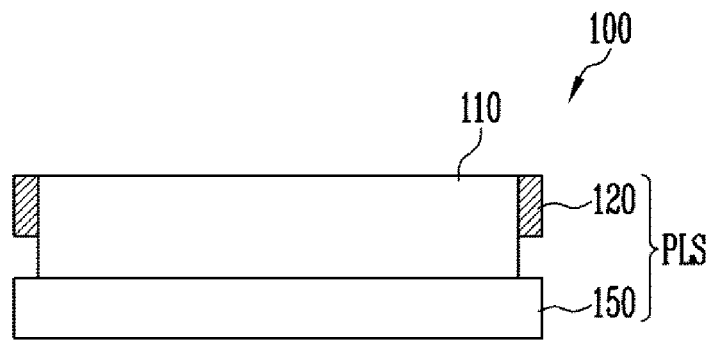

Referring to FIGS. 5A, 5B, and 5C, the state sensing unit 12 may sense a state (e.g., a normal state NMS, a push state PSS, or a pull state PLS) of the bezel. Details pertaining to this will be explained later herein with reference to FIGS. 5A, 5B, and 5C.

The state sensing unit 12 may generate state information BSI corresponding to the state of the bezel, and transmit the generated state information BSI to the control unit 30.

The push sensing unit 13 may sense the push movement of the bezel (e.g., the downward movement of the bezel). The push sensing unit 13 may generate push information PSI corresponding to the push movement of the bezel, and transmit the generated push information PSI to the control unit 30. The push sensing unit 13 may include an optical encoder, push switch, or a rocker switch.

The pull sensing unit 14 may sense the pull movement of the bezel (e.g., the upward movement of the bezel). The pull sensing unit 14 may generate pull information PLI corresponding to the pull movement of the bezel, and transmit the generated pull information PLI to the control unit 30. The pull sensing unit 14 may include an optical encoder, pull switch, or a rocker switch. Alternatively, the pull sensing unit 14 may have combined circuity with the push sensing unit 13 such as a combined push-pull switch.

The touch sensing unit 20 may sense a touch generated by the user. For example, the touch may be generated by a part of the body of the user, a touch pen, a stylus pen, or the like. The touch sensing unit 20 may generate touch information TI about the touch, and transmit the generated touch information TI to the control unit 30. The touch sensing unit 20 may include a touch sensing panel and a touch controller for generating touch information TI.

The control unit 30 may control the overall operation of the smart watch 100. For example, the control unit 30 may process signals, data, information, etc. or drive an application program, based on information received from the bezel sensing unit 10 (e.g., at least one of the rotation direction information RDI, the rotation angle information RAI, the state information BSI, the push information PSI, the pull information PLI, and the touch information TI), thus providing appropriate information or function to the user, or processing it.

In an exemplary embodiment, the control unit 30 may unlock the smart watch 100, based on at least one of the rotation direction information RDI, the rotation angle information RAI, the state information BSI, the push information PSI, and the pull information PLI that have been received.

In an exemplary embodiment, the control unit 30 may perform user authentication, based on at least one of the rotation direction information RDI, the rotation angle information RAI, the state information BSI, the push information PSI, and the pull information PLI that have been received.

The words "user authentication" refers to determining whether a user of the smart watch 100 is a registered user or not.

To determine whether the user is a registered user, the smart watch 100 may receive a password or biometric information (e.g., information about a fingerprint, a palm print, blood, a cornea, and so forth)

Subsequently, the control unit 30 may unlock the smart watch 100, based on the result of the user authentication. Details pertaining to this will be explained later herein with reference to FIGS. 9 and 10.

The control unit 30 may output, to the output unit 40, at least one of image data IMG, sound data SND, and haptic data HTD corresponding to at least one of the rotation direction information RDI, the rotation angle information RAI, the state information BSI, the push information PSI, and the pull information PLI that has been received.

The control unit 30 may control the communication unit 50. For example, the control unit 30 may transmit a data request to the communication unit 50, and receive data according to the data request.

The control unit 30 may control the power supply unit 60. For example, the control unit 30 may transmit a power request to the power supply unit 60, and receive power according to the power request. The control unit 30 may provide the power received from the power supply unit 60 to each of the components included in the smart watch 100.

The control unit 30 may include a memory 31. As shown in FIG. 1, the memory 31 is disposed in the control unit 30, but the present disclosure is not limited to this. In an exemplary embodiment, the memory 31 may be a separate component disposed outside the control unit 30.

The memory 31 may store data which supports various functions of the smart watch 100. For example, the memory 31 may store at least one of the image data IMG, the sound data SND, and the haptic data HTD.

The memory 31 may store a plurality of application programs to be driven in the smart watch 100, data and commands for operations of the smart watch 100. At least some of such application programs may be downloaded from an external server through wireless communication. When the smart watch 100 is produced, at least some of such application programs may be present in the smart watch 100 to provide basic functions (e.g., functions of receiving and sending phone calls or text messages) of the smart watch 100 as a smart device. The application programs may be stored in the memory 31, be installed in the smart watch 100, and be driven by the control unit 30 to perform the operations (or functions) of the smart watch 100.

The output unit 40 may generate a visual, acoustic, or haptic effect, or the like. The output unit 40 may include a display device 41, a speaker 42, and a haptic module 43.

The display device 41 may generate a visual effect, based on the image data IMG received from the control unit 30. For instance, the display device 41 may display an image corresponding to the image data IMG.

In an exemplary embodiment, the display device 41 may form a mutual layer structure or integrated structure with the touch sensing unit 20 to embody a touch screen.

Hereinafter, it will be assumed that the display device 41 is embodied as the touch screen. However, the present disclosure is not limited to this, and the display device 41 may be a component separately provided from the touch sensing unit 20.

The speaker 42 may generate an acoustic effect, based on the sound data SND received from the control unit 30. For instance, the speaker 42 may reproduce sound corresponding to the sound data SND.

The haptic module 43 may generate various haptic effects (s) which can be sensed by the user, based on the haptic data HTD received from the control unit 30.

In an exemplary embodiment, the haptic effects generated by the haptic module 43 may include a vibration effect. The haptic module 43 may vibrate in at least one of a plurality of vibration patterns. The haptic module 43 may provide a vibration effect corresponding to at least one of the plurality of vibration patterns to the user.

In an exemplary embodiment, the magnitude, the pattern, etc. of vibration generated by the haptic module 43 may be controlled by the control unit 30. For example, the haptic module 43 may output a combination of different vibration patterns, or successively output the different vibration patterns.

In an exemplary embodiment, the haptic module 43 may provide vibration to a portion of the smart watch 100 which is brought into contact with the user.

The haptic module 43 may generate not only vibration but also various haptic effects, e.g., an effect of stimulation caused by pins which are arranged to make vertical contact with the surface of the skin of the user, discharge or suction force of air through discharge or suction holes, an element brushing by the surface of the skin of the user, an electrode making contact with the skin of the user, or electrostatic force, and a cold or hot sensation effect using an element having a heat absorbing or generating function.

Not only can the haptic module 43 provide a haptic effect to the user by making direct contact with the user, but it can also be embodied such that the user may feel haptic effects through muscular sensation of the fingers, the arm, etc. of the user.

The communication unit 50 may wirelessly communicate with at least one of a wireless communication system, a network system, another smart device, and the external server under the control of the control unit 30. For example, the communication unit 50 may include at least one of a broadcast receiving module, a mobile communication module, a wireless internet module, a local area communication module, and a location information module. The communication unit 50 may include a transmitter that transmits one or more radio frequency signals.

The power supply unit 60, under the control of the control unit 30, may provide external power or internal power to the control unit 30, but the present disclosure is not limited to this. In an exemplary embodiment, the power supply unit 60 may directly provide the external power or the internal power to each of the components of the smart watch 100.

The power supply unit 60 may include a battery (not shown). The battery (not shown) may be an embedded battery or a replaceable battery.

At least some of the foregoing components may operate in cooperation with each other, to embody the operation or the control of the smart watch 100 or a method of controlling the smart watch 100 according to various exemplary embodiments to be explained below. The operation or the control of the smart watch 100, or a method for unlocking the smart watch 100 may be embodied in the smart watch 100 by driving at least one application program.

In FIGS. 2A, 2B, 3, 4A, 4B, 5A, 5B, 5C, 6, 7, and 8, all of the components described in FIG. 1 are not illustrated, and only some important components are illustrated. However, it should be understood that the components described in FIG. 1 may be included in the smart watch 100 shown in FIGS. 2A, 2B, 3, 4A, 4B, 5A, 5B, 5C, 6, 7, and 8 to provide a function as a smart device.

Figure 2A:
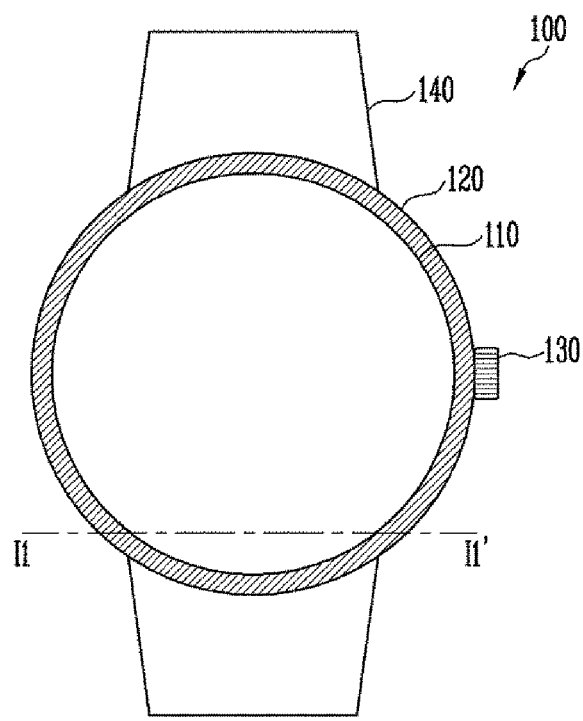
FIGS. 2A and 2B are views illustrating a smart watch according to an exemplary embodiment of the present disclosure.
Figure 2B:
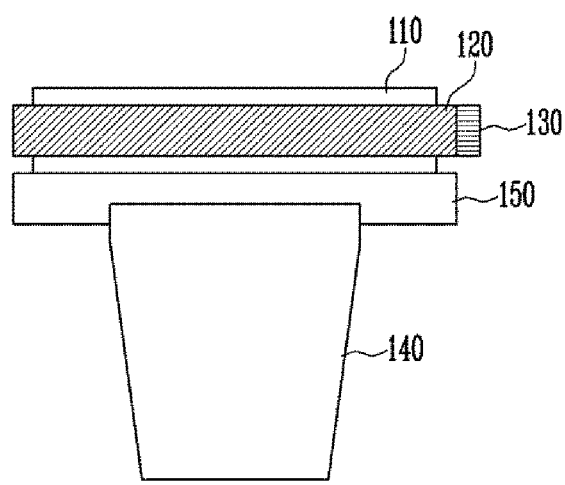

FIGS. 2A and 2B are views illustrating the smart watch 100 according to an exemplary embodiment of the present disclosure.

In FIGS. 2A and 2B, the case where the smart watch 100 is wearable on the body of a user, particularly, the wrist of the user, is illustrated. In other words, it is formed in the form of a watch, but the present disclosure is not limited to this. In an exemplary embodiment, the smart watch 100 may be provided in various forms (e.g., the form of a necklace, an earring, a belt, an anklet, etc.). In other words, the configuration of a certain type of smart watch 100 and explanation thereof may be generally applied to other types of smart watches.

Referring to FIGS. 2A and 2B, the smart watch 100 may include a display device 110, a bezel 120, a stem 130, a band 140, and a main body 150.

Referring to FIGS. 1, 2A, and 2B, the display device 110 may have substantially the same configuration as that of the display device 41 described in FIG. 1. Therefore, repetitive detailed description will be omitted. The display device 110 may be disposed on an upper surface of the main body 150.

The bezel 120 may be embodied by an annular member extending along the perimeter of the display device 110.

The bezel 120 may be moved by rotation.

In an exemplary embodiment, the bezel 120 may be rotated manually or automatically. Details pertaining to this will be explained later herein with reference to FIGS. 4A and 4B.

In an exemplary embodiment, the user may control the smart watch 100 by rotating the bezel 120. When the bezel 120 is rotated, hands included in an imaginary analog watch displayed on the display device 110 may be controlled, or a list displayed on the display device 110 may be scrolled. Furthermore, when the bezel 120 is rotated, an object displayed on the display device 110 may be enlarged or reduced.

The bezel 120 may move upward or downward. However, the present disclosure is not limited to this, the bezel 120 may be designed so as to be movable in various directions.

In addition, the bezel 120 may be moved manually or automatically. Details pertaining to this will be explained later herein with reference to FIGS. 5A, 5B, and 5C.

The stem 130 may refer to a crown coupled to a side portion of the smart watch 100.

The stem 130 may be rotated or moved in a manner similar to that of the bezel 120.

In an exemplary embodiment, the user may control the smart watch 100 by rotating the stem 130. When the stem 130 is rotated, hands included in an imaginary analog watch displayed on the display device 110 may be controlled, or a list displayed on the display device 110 may be scrolled. Furthermore, when the stem 130 is rotated, an object displayed on the display device 110 may be enlarged or reduced.

The band 140 may be formed to fix the main body 150 to the wrist of the user.

The band 140 may be worn on the wrist of the user in such a way that it wraps the wrist. The band 140 may be made of at least one material of iron, titanium, stainless steel, leather, rubber, silicon, and synthetic resin.

In an exemplary embodiment, the band 140 may be configured to be removable from the main body 150 so that the user may replace the band 140 with a band having a different shape depending on the preference of the user.

The main body 150 may include various components of the smart watch 100 or be coupled with the components. In detail, the main body 150 may include at least one of the bezel sensing unit 10, the control unit 30, the speaker 42, the haptic module 43, the communication unit 50, and the power supply unit 60 that are shown in FIG. 1.

For example, the main body 150 may come into contact with the wrist of the user.

In FIG. 2B, an example in where the display device 110 and the main body 150 are formed separately from each other is illustrated, but the present disclosure is not limited to this. For instance, the display device 110 and the main body 150 may be integrated with each other.

Figure 3:
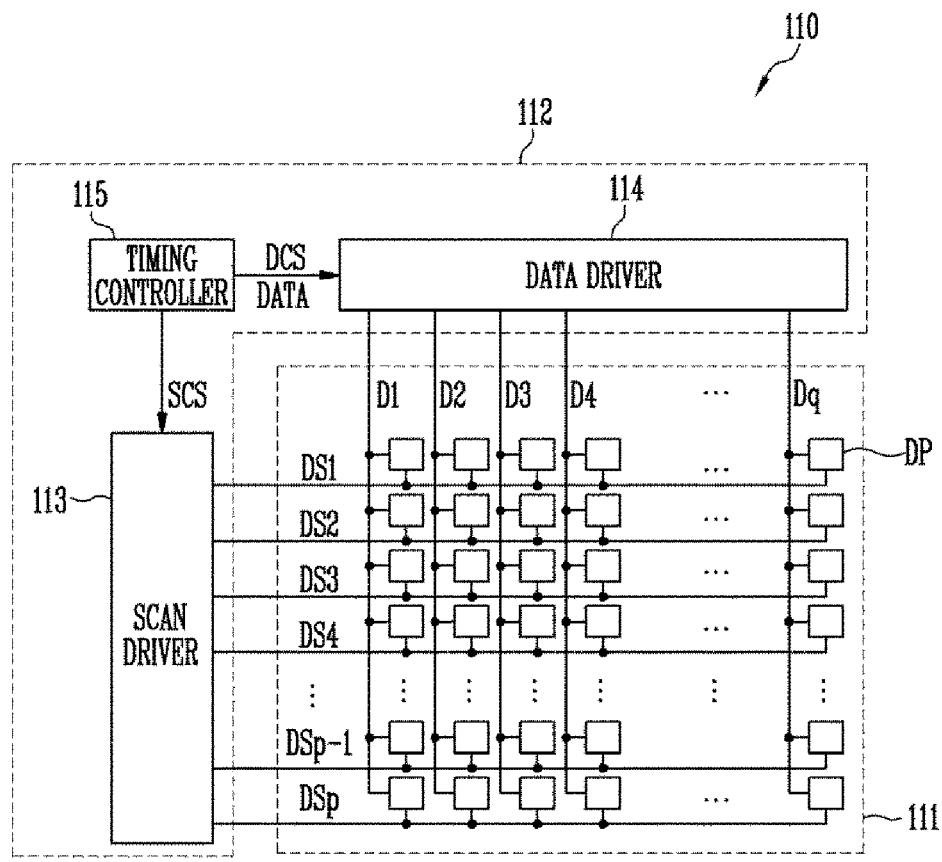
FIG. 3 is a diagram illustrating in detail a display device according to an exemplary embodiment of the present disclosure.

FIG. 3 is a diagram illustrating in detail a display device 110 according to an exemplary embodiment of the present disclosure. Referring to FIG. 3, the display device 110 according to an exemplary embodiment of the present disclosure may include a display pixel unit 111.

The display pixel unit 111 may include a plurality of display pixels DP.

The display pixels DP may be coupled to data lines D1 to Dq and display scan lines DS1 to DSp. For example, the display pixels DP may be arranged in the form of a matrix at intersections of the data lines D1 to Dq and the display scan lines DS1 to DSp.

The respective display pixels DP may be supplied with data signals and display scan signals through the data lines D1 to Dq and the display scan lines DS1 to DSp.

Each display pixel DP may include a light-emitting element (e.g., an organic light-emitting diode), and may generate light corresponding to a data signal using current flowing from a first power source (ELVDD) into a second power source (ELVSS) via the light-emitting element.

The display device 110 according to an exemplary embodiment of the present disclosure may further include a display driving unit 112 for driving the display pixel unit 111.

The display driving unit 112 may include a scan driver 113, a data driver 114, and a timing controller 115.

The scan driver 113 may provide display scan signals to the display scan lines DS1 to DSp in response to a scan driver control signal SCS. For example, the scan driver 113 may sequentially supply display scan signals to the display scan lines DS1 to DSp.

For connection with the display scan lines DS1 to DSp, the scan driver 113 may be directly mounted on a display substrate or may be coupled to the display substrate through a separate component such as a flexible printed circuit board.

The data driver 114 may receive a data driver control signal DCS and image data DATA from the timing controller 115 and then generate data signals.

The data driver 114 may supply generated data signals to the data lines D1 to Dq.

For connection with the data lines D1 to Dq, the data driver 114 may be directly mounted on the display substrate or may be coupled to the display substrate through a separate component such as a flexible printed circuit board.

When a display scan signal is provided through a certain display scan line, some display pixels DP coupled to the certain display scan line may be supplied with data signals transmitted from the data lines D1 to Dq and emit light at luminance levels corresponding to the supplied data signals.

The timing controller 115 may generate control signals for controlling the scan driver 113 and the data driver 114.

For example, the control signals may include a scan driver control signal SCS for controlling the scan driver 113, and a data driver control signal DCS for controlling the data driver 114.

The timing controller 115 may provide the scan driver control signal SCS to the scan driver 113 and provide the data driver control signal DCS to the data driver 114.

The timing controller 115 may convert the image data DATA in conformity with the specification of the data driver 114 and provide the converted data to the data driver 114.

In FIG. 3, there is illustrated an example in which the scan driver 113, the data driver 114, and the timing controller 115 are separately provided, but at least some of the foregoing components may be integrated with each other if needed.

In an exemplary embodiment, the data driver 114 may be integrated with the scan driver 113 shown in FIG. 3, if needed.

The scan driver 113, the data driver 114, and the timing controller 115 may be installed using any one of various methods, such as chip on glass, chip on plastic, tape carrier package, and chip on film methods.

FIGS. 4A and 4B are views illustrating an operation of a smart watch 100 according to an exemplary embodiment of the present disclosure. In detail, FIGS. 4A and 4B illustrate the rotation of the bezel 120 of the smart watch 100.

Referring to FIGS. 4A and 4B, the display device 110 may display a plurality of objects. For the sake of explanation, in FIGS. 4A and 4B, twelve numeral objects are illustrated, but the present disclosure is not limited to this. In an exemplary embodiment, the display device 110 may display character objects, mark objects, or picture objects.

The display device 110 may display the twelve numeral objects sequentially arranged along the perimeter thereof.

The display device 110 may display a pointer PT. For example, the pointer PT may have the form of a thick circle surrounding any one of the twelve numeral objects. However, the present disclosure is not limited to this, and the pointer PT may be set in various manners depending on the intention of the designer.

In an exemplary embodiment, the pointer PT may be initially disposed at numeral object "12." In this case, the pointer PT may be displayed in the form of a circle surrounding numeral object "12."

The user may rotate the bezel 120 using his/her hand.

The user may check the rotation of the bezel 120 through the display device 110.

In a first exemplary embodiment, the display device 110 may display the movement of the pointer PT, based on the rotation direction and the rotation angle of the bezel 120. In this case, the positions of the numeral objects may be fixed, and only the position of the pointer PT is changed.

In a second exemplary embodiment, the display device 110 may display movement of the twelve numeral objects, based on the rotation direction and the rotation angle of the bezel 120. In this case, the position of the pointer PT may be fixed, and only the positions of the twelve numeral objects are changed.

In detail, referring to FIGS. 1, 2A, 2B, 3, 4A, and 4B, the rotation sensing unit 11 may sense the rotation direction and the rotation angle of the bezel 120.

The rotation sensing unit 11 may generate rotation direction information RDI corresponding to the rotation direction of the bezel 120, and output the generated rotation direction information RDI to the control unit 30. The rotation sensing unit 11 may generate rotation angle information RAI corresponding to a rotation angle RA of the bezel 120, and transmit the generated rotation angle information RAI to the control unit 30.

The control unit 30 may transmit an image data IMG corresponding to the received rotation direction information RDI and the received rotation angle information RAI, to the display device 110.

Therefore, as described above, the display device 110 may display an image according to the rotation direction information RDI and the rotation angle information RAI, and the user may check precise movement of the bezel 120 with his/her eyes and control the rotation of the bezel 120.

Hereinafter, the first exemplary embodiment in which the pointer PT moves according to the rotation of the bezel 120 will be representatively described. The following description may also be applied to the second exemplary embodiment.

When the user rotates the bezel 120 in a counterclockwise direction RD1, the pointer PT may move in the counterclockwise direction RD1. When the user rotates the bezel 120 in a clockwise direction RD2, the pointer PT may move in the clockwise direction RD2.

When the user rotates the bezel 120 by a rotation angle RA, the pointer PT may move by an angle corresponding to the rotation angle RA.

In FIGS. 4A and 4B, although the rotation angle RA has been illustrated as being measured based on the direction of 12 o'clock, the present disclosure is not limited to this.

For example, when the user rotates the bezel 120 by an angle of 135° or more and less than 165° in the counterclockwise direction RD1, the pointer PT may move from numeral object "12" to numeral object "7."

When the user rotates the bezel 120 by an angle of 15° or more and less than 45° in the clockwise direction RD2, the pointer PT may move from numeral object "12" to numeral object "1."

In an exemplary embodiment, the bezel 120 may automatically rotate.

For example, when the user releases the bezel 120 that has been rotated by the rotation angle RA in the counterclockwise direction RD1 or the clockwise direction RD2, the bezel 120 may automatically rotate by the rotation angle RA in the clockwise direction RD2 or the counterclockwise direction RD1.

The operation of the smart watch is not limited to the above-described contents. In other words, the smart watch according to an exemplary embodiment of the present disclosure may operate in various manners that can be deduced by those skilled in the art within the scope of the purposes to be achieved by the above-described contents.

FIGS. 5A, 5B, and 5C are views illustrating the movement and the state of a bezel 120 included in a smart watch 100 according to an exemplary embodiment of the present disclosure. FIGS. 5A, 5B, and 5C are sectional views taken along line I1-I1' of the smart watch 100 shown in FIG. 2A.

FIG. 5A illustrates the bezel 120 that is in the normal state NMS. In detail, the normal state NMS may refer to a state in which the bezel 120 is disposed at an initial position (e.g., the position of the bezel 120 shown in FIG. 5A).

FIG. 5B illustrates the bezel 120 that is in the push state PSS. In detail, the push state PSS may refer to a state in which the bezel 120 is disposed at a bottom position (e.g., the position of the bezel 120 shown in FIG. 5B) lower than the initial position.

For instance, when the bezel 120 is in the push state PSS, a lower surface of the bezel 120 and an upper surface of the main body 150 may come into contact with each other. However, the present disclosure is not limited to this.

In an exemplary embodiment, the state of the bezel 120 may be changed from the normal state NMS to the push state PSS, or from the push state PSS to the normal state NMS.

FIG. 5C illustrates the bezel 120 that is in the pull state PLS. In detail, the pull state PLS may refer to a state in which the bezel 120 of the smart watch 100 is disposed at a top position (e.g., the position of the bezel 120 shown in FIG. 5C) higher than the initial position.

For example, when the bezel 120 is in the pull state PLS, an upper surface of the bezel 120 and an upper surface of the display device 110 may be leveled with each other. However, the present disclosure is not limited to this.

In an exemplary embodiment, the state of the bezel 120 may be changed from the normal state NMS to the pull state PLS, or from the pull state PLS to the normal state NMS.

In an exemplary embodiment, the state of the bezel 120 may be automatically changed. In other words, the bezel 120 may be automatically driven upward/downward. For example, when the user releases the bezel 120 that has been changed from the normal state NMS to the push state PSS, the bezel 120 may automatically move upward and return to the normal state NMS. Likewise, when the user releases the bezel 120 that has been changed from the normal state NMS to the pull state PLS, the bezel 120 may automatically move downward and return to the normal state NMS.

Referring to FIGS. 5A, 5B, and 5C, the bezel 120 may be directly changed from the pull state PLS to the push state PSS. Furthermore, the bezel 120 may be directly changed from the push state PSS to the pull state PLS.

Referring to FIGS. 4A, 4B, and 5C, the bezel 120 may be rotated while keeping any one of the normal state NMS, the push state PSS and the pull state PLS.

Referring to FIGS. 1, 2A, 2B, 3, 4A, 4B, 5A, 5B, and 5C, the state sensing unit 12 may sense the state (e.g., the normal state NMS, the push state PSS, and the pull state PLS) of the bezel 120. The state sensing unit 12 may generate state information BSI corresponding to the state of the bezel, and transmit the generated state information BSI to the control unit 30.

The push sensing unit 13 may sense the push movement of the bezel 120 (e.g., the downward movement of the bezel 120), generate the push information PSI, and transmit the generated push information PSI to the control unit 30.

The pull sensing unit 14 may sense the pull movement of the bezel 120 (e.g., the upward movement of the bezel 120), generate the pull information PLI, and transmit the generated pull information PLI to the control unit 30.

Figure 6:
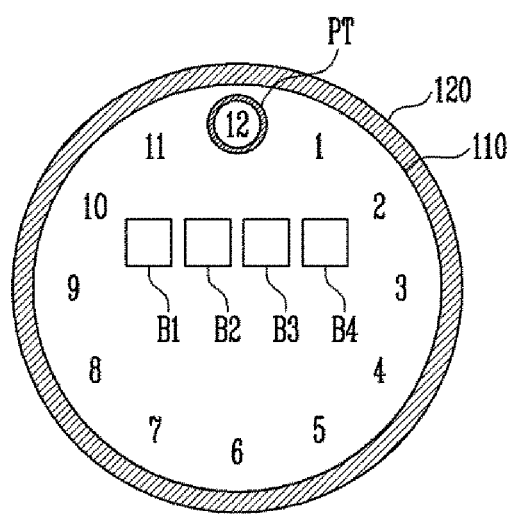
FIG. 6 is a view illustrating a method for unlocking a smart watch according to an exemplary embodiment of the present disclosure.

FIG. 6 is a view illustrating a method for unlocking a smart watch 100 according to an exemplary embodiment of the present disclosure.

Referring to FIGS. 4A, 4B, 5A, 5B, 5C, and 6, the display device 110 may display twelve numeral objects. The display device 110 may display a pointer PT and a plurality of blanks B1, B2, B3, and B4.

The display device 110 may display the twelve numeral objects sequentially arranged along the perimeter thereof.

In an exemplary embodiment, the pointer PT may be initially disposed at numeral object "12." In this case, the pointer PT is displayed in the form of a circle surrounding numeral object "12."

The user may use the bezel 120 to select any one of the twelve numeral objects. Numeral objects selected by the user among the twelve numeral objects may be successively inputted to the plurality of blanks B1 to B4.

For example, the user may dispose any one of the twelve numeral objects at the pointer PT by rotating the bezel 120. Thereafter, the user may input the any one of the twelve numeral objects that is disposed at the pointer PT to a corresponding one of the plurality of blanks B1 to B4.

A method of inputting the any one by the user may be embodied in various ways.

For example, the user may input the any one of the twelve numeral objects by changing the rotation direction of the bezel 120. Alternatively, the user may input the any one of the twelve numeral objects by stopping the rotation of the bezel 120 for a predetermined time. As a further alternative, the user may input the any one of the twelve numeral objects by changing the state of the bezel 120. In other words, the user may input the any one by pushing or pulling the bezel 120.

In addition to the above described methods, various methods that can be deduced by those skilled in the art may be used to input any one of the twelve numeral objects.

The number of blanks B1 to B4 is determined based on the length of a preset registered password. In FIG. 6, the case where the length of the preset registered password is four digits is illustrated, but the present disclosure is not limited to this.

If the user inputs four of the twelve numeral objects to the blanks B1 to B4, the inputted four numeral objects may be determined as an input password.

In the above-described manner, the user may input the input password using the bezel 120 of the smart watch 100.

Referring to FIGS. 1, 2A, 2B, 3, 4A, 4B, 5A, 5B, 5C, and 6, the control unit 30 may compare the input password with the registered password. For example, the registered password may be stored in the memory 31 shown in FIG. 1, but the present disclosure is not limited to this.

The control unit 30 may authenticate the user when the input password matches the registered password. The control unit 30 may unlock the smart watch 100, based on the result of the user authentication.

Figure 7:
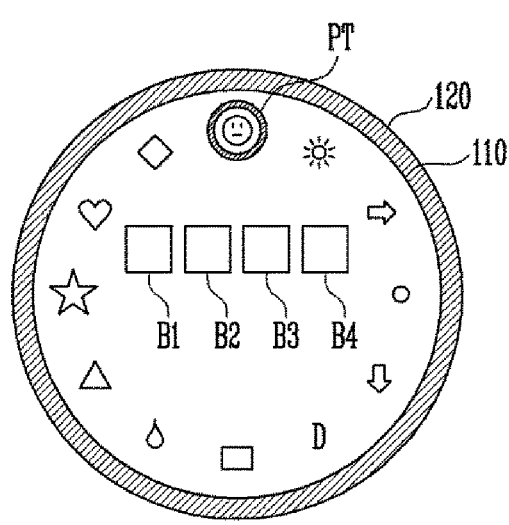
FIG. 7 is a view illustrating a method for unlocking a smart watch according to an exemplary embodiment of the present disclosure.

FIG. 7 is a view illustrating a method for unlocking a smart watch 100 according to an exemplary embodiment of the present disclosure.

Referring to FIGS. 4A, 4B, 5A, 5B, 5C, 6, and 7, the display device 110 may display twelve mark objects. The display device 110 may display a pointer PT and a plurality of blanks B1 to B4.

The display device 110 may display the twelve mark objects sequentially arranged along the perimeter thereof.

The pointer PT may be initially disposed at a "face" mark object, but the present disclosure is not limited to this.

The user may use the bezel 120 to select any one of the twelve mark objects. Mark objects selected by the user among the twelve mark objects may be successively inputted to the plurality of blacks B1 to B4.

For example, the user may dispose any one of the twelve mark objects at the pointer PT by rotating the bezel 120. Thereafter, the user may input the any one of the twelve mark objects that is disposed at the pointer PT to the plurality of blanks B1 to B4.

A method of inputting the any one by the user may be embodied in various manners, as described with reference to FIG. 6.

The number of blanks B1 to B4 is determined based on the length of a preset registered password. In FIG. 7, the case where the length of the preset registered password is four digits is illustrated, but the present disclosure is not limited to this.

If the user inputs four of the twelve mark objects to the blanks B1 to B4, the inputted four mark objects may be determined as an input password.

In the same manner as that described with reference to FIG. 6, the user may input the input password using the bezel 120 of the smart watch 100.

Referring to FIGS. 1, 2A, 2B, 3, 4A, 4B, 5A, 5B, 5C, 6, and 7, the control unit 30 may compare the input password with the registered password.

The control unit 30 may authenticate the user when the input password matches the registered password. The control unit 30 may unlock the smart watch 100, based on the result of the user authentication.

Figure 8:
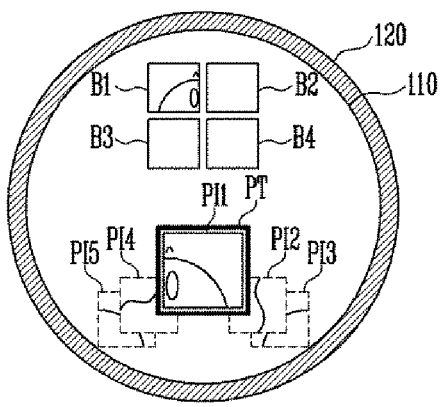
FIG. 8 is a view illustrating a method for unlocking a smart watch according to an exemplary embodiment of the present disclosure.

FIG. 8 is a view illustrating a method for unlocking a smart watch 100 according to an exemplary embodiment of the present disclosure.

Referring to FIGS. 4A, 4B, 5A, 5B, 5C, 6, 7, and 8, the display device 110 may display five picture objects PI1 to PI5. The display device 110 may display a pointer PT and a plurality of blanks B1 to B4.

The display device 110 may display the five picture objects PI1, PI2, PI3, PI4, and PI5, which are sequentially arranged, and the five picture objects may be some of a plurality of objects.

In FIG. 8, there are illustrated the five picture objects, but the present disclosure is not limited to this. Depending on exemplary embodiments, the number of picture objects displayed on the display device 110 may be changed in various ways.

The pointer PT may be initially disposed at a first picture object PI1, but the present disclosure is not limited to this.

The display device 110 may scroll the picture objects based on the rotation direction and the rotation angle of the bezel 120.

The term "scrolling" refers to an operation of moving displayed picture objects in an up/down direction or a left/right direction so that a previously-displayed picture object disposed on one end of the display device 100 is removed and another picture object is created on the opposite end of the display device 100.

In this case, the position of the pointer PT is fixed, and only the positions of the five picture objects PI1 to PI5 are changed.

The user may use the bezel 120 to select any one of the picture objects. Picture objects selected by the user among the picture objects may be successively inputted to the plurality of blanks B1 to B4.

For example, the user may dispose any one of the picture objects at the pointer PT by rotating the bezel 120. Thereafter, the user may input the any one of the picture objects that is disposed at the pointer PT to a corresponding one of the plurality of blanks B1 to B4.

A method of inputting the any one by the user may be embodied in various manners, as described with reference to FIG. 6.

The number of blanks B1 to B4 may be determined based on the length of the preset registered password. In FIG. 7, there is illustrated the case where the length of the preset registered password is four digits, but the present disclosure is not limited to this.

If the user inputs four of the picture objects PI1 to PI5 to the blanks B1 to B4, the inputted four picture objects may be determined as an input password.

For example, the picture objects inputted to the plurality of blanks B1 to B4 may form at least one image, and the image formed by the picture objects may be an image preset by a certain user. However, the present disclosure is not limited to this.

In an exemplary embodiment, the preset image may be stored in the memory 31 shown in FIG. 1.

In the above-described manner, the user may input the input password using the bezel 120 of the smart watch 100.

Referring to FIGS. 1, 2A, 2B, 3, 4A, 4B, 5A, 5B, 5C, 6, 7, and 8, the control unit 30 may compare the input password with the registered password. For instance, the registered password may be previously stored in the memory 31, but the present disclosure is not limited to this.

When the input password matches the registered password, the control unit 30 may authenticate the user and unlock the smart watch 100.

Figure 9:
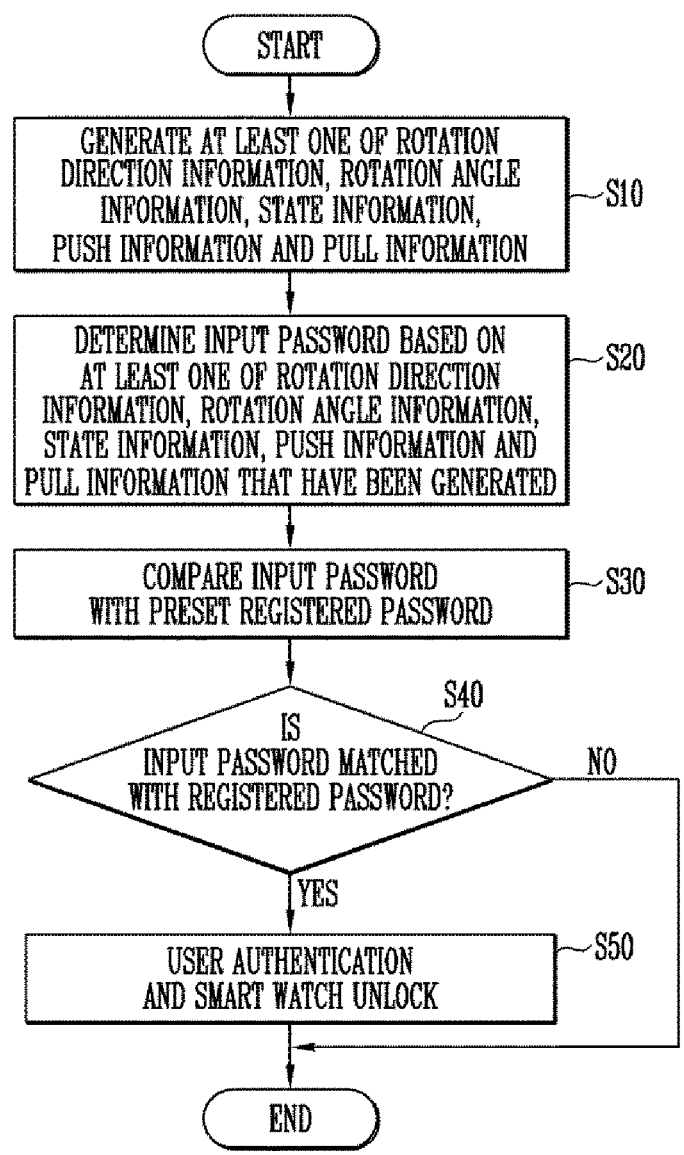
FIG. 9 is a flowchart illustrating a method for unlocking a smart watch according to an exemplary embodiment of the present disclosure.

FIG. 9 is a flowchart illustrating a method for unlocking a smart watch 100 according to an exemplary embodiment of the present disclosure.

To avoid redundancy of explanation, description of contents overlapping with those of FIGS. 6, 7, and 8 will be omitted.

Referring to FIGS. 1, 2A, 2B, 3, 4A, 4B, 5A, 5B, 5C, 6, 7, 8, and 9, the smart watch 100 may generate bezel information, based on the movement or the state of the bezel 120, at step S10.

The bezel information may include at least one of rotation direction information RDI, rotation angle information RAI, state information BSI, push information PSI and pull information PLI.

The smart watch 100 may determine an input password based on the generated bezel information, at step S20.

The smart watch 100 may compare the input password with a registered password, at step S30. For example, the registered password may be information that is preset and stored in the memory 31.

When the input password matches the registered password (i.e., "YES" at step S40), the user may be authenticated, and the smart watch 100 may be unlocked.

Figure 10:
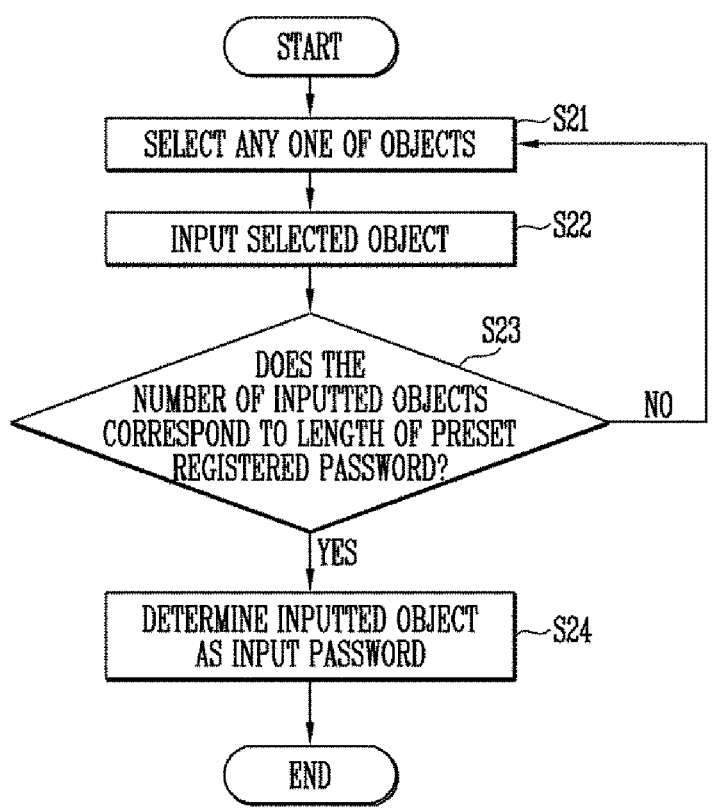
FIG. 10 is a flowchart illustrating the step of determining a password in the smart watch illustrated in FIG. 9.

FIG. 10 is a flowchart illustrating the step of determining the input password in the smart watch 100 illustrated in FIG. 9.

Referring to FIGS. 1, 2A, 2B, 3, 4A, 4B, 5A, 5B, 5C, 6, 7, 8, 9, and 10, any one of the plurality of objects may be selected, at step S21. For example, the user may select any one of the plurality of objects by changing the object disposed at the pointer PT using the bezel 120.

The selected object may be inputted, at step S22. For instance, the object selected by the user may be inputted in various ways.

When the number of inputted objects does not correspond to the length of the preset registered password (i.e., "NO" at step S23), any one of the plurality of objects may be selected again, at step S21.

When the number of inputted objects corresponds to the length of the preset registered password (i.e., YES" at step S23), the smart watch 100 may determine the inputted objects as the input password, at step S24.

Various exemplary embodiments of the present disclosure may provide a smart watch having improved security performance, and a method for unlocking the smart watch.

In exemplary embodiments, control unit 30, state sensing unit 12, touch controller, timing controller and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, control unit 30, state sensing unit 12, touch controller, timing controller and/or one or more components thereof may include or otherwise be associated with one or more memories (not shown) including code (e.g., instructions) configured to cause control unit 30, state sensing unit 12, touch controller, timing controller and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A smart watch, comprising:
   a display device configured to display an image and a plurality of objects;
   a main body configured to support the display device;
   a bezel disposed on a perimeter of the display device and configured to rotate relative to the main body and to move toward or away from the main body;
   and
   a band coupled to the main body,
   wherein:
   the main body comprises:
   a bezel sensing unit configured to sense movement of the bezel relative to the main body; and
   a control unit configured to:
      authenticate a user based on information received from the bezel sensing unit, and
      unlock the smart watch in response to the control unit authenticating the user;
   at least one of the objects is selected and inputted to the control unit based on a rotation direction of the bezel, a rotation angle of the bezel, movement of the bezel away from the main body, and movement of the bezel toward the main body;
   the control unit is configured to unlock the smart watch based on the selected and inputted at least one of the objects;
   the bezel sensing unit comprises:
      a rotation sensing unit configured to sense the rotation direction and the rotation angle of the bezel and generate rotation direction information and rotation angle information;
      a push sensing unit configured to sense the movement of the bezel toward the main body and generate push information; and
      a pull sensing unit configured to sense the movement of the bezel away from the main body and generate pull information;
   the at least one of the objects is selected based on the rotation direction information and the rotation angle information; and
   the selected at least one of the objects is inputted based on the push information or the pull information.

2. The smart watch according to claim 1, wherein the control unit is configured to determine an input password based on the inputted at least one of the objects, and unlock the smart watch when the input password matches a registered password.

3. The smart watch according to claim 2, wherein the control unit comprises a memory configured to store the registered password.

4. The smart watch according to claim 1, further comprising:
   a communication unit configured to wirelessly communicate with at least one of a wireless communication system, a network system, a smart device, and an external server controlled by the control unit.

5. The smart watch according to claim 1, further comprising:
   a stem coupled to a side portion of the bezel and configured to rotate.

6. The smart watch according to claim 1, further comprising:
   a touch sensing unit configured to sense a touch of the user and generate touch information.

7. The smart watch according to claim 1, wherein the main body further comprises:
   a speaker configured to generate an acoustic effect, based on sound data received from the control unit; and a haptic module configured to generate a haptic effect, based on haptic data received from the control unit.

8. A method for unlocking a smart watch including a display device configured to display a plurality of objects, a main body supporting the display device, and a bezel disposed on a perimeter of the display device and configured to rotate relative to the main body and to move toward or away from the main body, the method, comprising:

generating bezel information including rotation direction information based on a rotation direction of the bezel relative to the main body, rotation angle information based on a rotation angle of the bezel relative to the main body, pull information based on movement of the bezel away from the main body, and push information based on movement of the bezel toward the main body;

determining an input password based on the bezel information;

comparing the input password with a registered password; and unlocking the smart watch when the input password matches the registered password, wherein the determining of the input password comprises:

selecting one of the plurality of objects based on the rotation direction information and the rotation angle information; and inputting the selected object based on the pull information or the push information.

9. The method according to claim 8, wherein the determining of the input password further comprises:

selecting one of the plurality of objects again when the number of inputted objects does not correspond to a length of the registered password; and determining the inputted objects as the input password when the number of inputted objects corresponds to the length of the registered password.

10. The method according to claim 8, wherein each of the plurality of objects is a mark object or a numeral object.

11. The method according to claim 8, wherein each of the plurality of objects is a picture object, and wherein the plurality of objects form at least one image.

* * * * *